Aug. 4, 1959 P. K. WEIMER 2,898,489

TARGETS FOR TELEVISION PICKUP TUBES

Filed Oct. 4, 1954 5 Sheets-Sheet 1

INVENTOR.
PAUL K. WEIMER

BY William A. Zalesak
ATTORNEY

Fig. 2
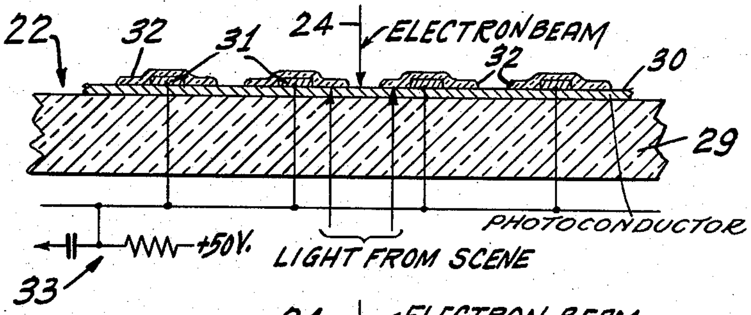
Fig. 3
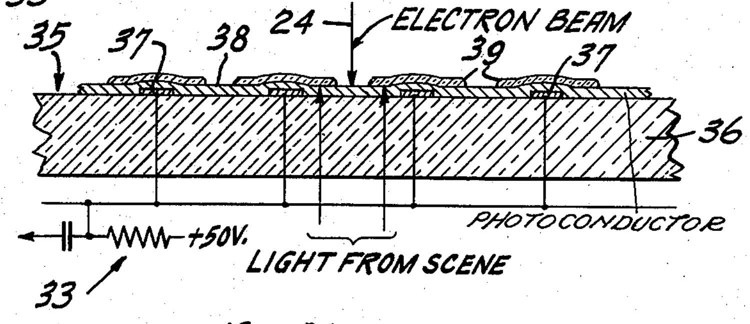
Fig. 4
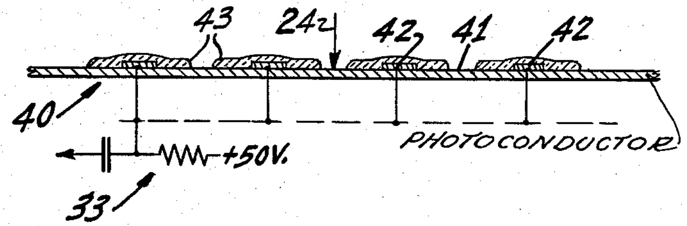
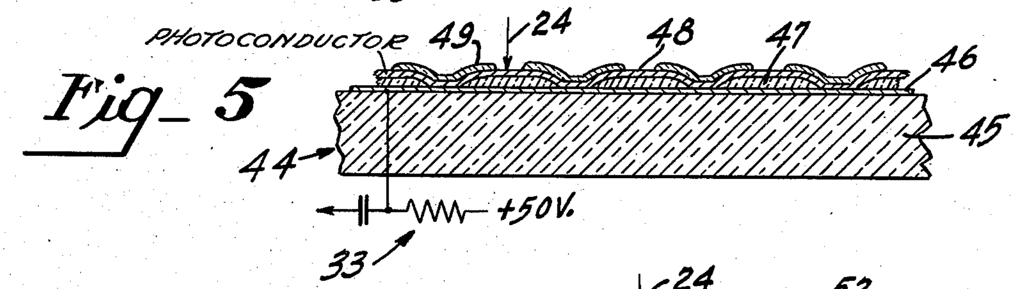
Fig. 6
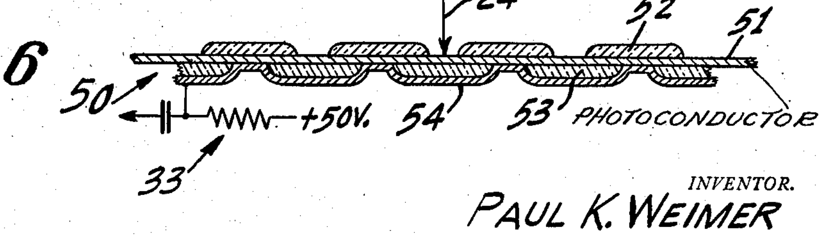
INVENTOR.
PAUL K. WEIMER
BY William A. Zalesak
ATTORNEY INVENTOR.
PAUL K. WEIMER
BY William A. Zalesak
ATTORNEY Aug. 4, 1959 P. K. WEIMER 2,898,489

TARGETS FOR TELEVISION PICKUP TUBES

Filed Oct. 4, 1954 5 Sheets-Sheet 4

INVENTOR.
PAUL K. WEIMER

BY William A. Zalesak
ATTORNEY

INVENTOR.
PAUL K. WEIMER
BY William A. Zalesak
ATTORNEY

United States Patent Office 2,898,489

Patented Aug. 4, 1959

2,898,489

TARGETS FOR TELEVISION PICKUP TUBES

Paul K. Weimer, Princeton, N.J., assignor to Radio Corporation of America, a corporation of Delaware Application October 4, 1954, Serial No. 459,978

22 Claims. (Cl. 313—65)

This invention relates to television camera tubes and particularly to an improved target structure for television camera, or pickup tubes and is useful in both monochrome and color applications.

In conventional television camera tubes of the type described in an article entitled, "The Vidicon-Photoconductive Camera Tube," by P. K. Weimer, S. V. Forgue, and R. R. Goodrich, appearing in the May 1950 issue of "Electronics," the elongated envelope of the tube has on one end a thin layer of photoconductive material deposited on a transparent electrode which is usually a conductive film on the face plate of the envelope. This conductive film is normally referred to as the signal plate. An electron beam from an electron gun at the other end of the tube scans the surface of the photoconductor to set up a charge thereon. When exposed to light, a flow of electrons occurs between the two faces of the target through the photoconductive layer at the illuminated areas in accordance with light intensity. This action produces a signal which can be used to transmit the scene picked up. While this arrangement makes a fairly simple target for television camera tubes, certain improvements result by using target structures made in accordance with this invention.

When utilizing the conventional type photoconductive targets, the magnitude of the RC time constant for storage purposes, that is the time for the charge to leak through the photoconductive layer, is a function of the material alone. In other words, the magnitude of the time constant for storage purposes is independent of the thickness of the material, but depends upon the resistivity and the dielectric constant of the material. In order to operate in the conventional manner, i.e., with charge-storage of the picture for the entire scanning period, the RC time constant should not be less than one thirtieth of a second for standard operating conditions. Due to this one thirtieth of a second time limit on the RC time constant, there is a lower limit on the volume resistivity of the photoconductive layer of approximately $10^{11}$ ohm-centimeters. Several known photoconductive materials which have an extremely high sensitivity have a resistivity that is lower than this value of $10^{11}$ ohm-centimeters. Because of this low resistivity, these highly sensitive photoconductive materials have not been used for pickup tube operation when using conventional target structures and the known methods of operating pickup tubes. The reason for the lower limit on the volume resistivity of the photoconductor is that with lower resistivity the charge leaks off before the beam returns.

Furthermore, when using conventional methods of operation, the time constant of the target which is effective for discharge purposes is given by the product of the resistance of the electron beam and the total capacity of the target. Unless the capacity of the target is kept below several thousand micro-microfarads, the beam will be unable to discharge the target in one scan and thus "lag" will result. In the conventional types of targets, the capacity thereof is simply that of a parallel plate condenser for which:

$$C=\frac{kA}{4\pi d}$$

where:
C equals the capacity;
$k$ equals the dielectric constant;
A equals the area of the target; and
$d$ equal the thickness of the target.

In tubes utilizing the conventional type of target, it has been difficult to design a tube and keep the capacity of the target low enough to avoid "lag." Even with small targets, the thickness required to prevent "lag" is too thick for optimum sensitivity when utilizing certain well known photoconductive materials such as selenium or solid antimony sulfide.

Also, in present day pickup tubes, it is often desirable to utilize an electron multiplier to provide the output signals. In order to increase the sensitivity by means of an electron multiplier the smaller signal at the target requires a smaller electron beam. The smaller beam has a higher beam resistance which requires a smaller target capacity in order to avoid lag.

Still further, when using conventional types of targets, the thickness of the layer of photoconductive material decreases the sensitivity of the material due to the inherent absorptive properties of the material. In cases where the light is unable to penetrate the layer, or where the photoelectric charges released by the light are trapped before they traverse the layer, the efficiency of the target is greatly reduced. In other words, the thicker the material, the greater are the absorptive properties thereof.

Still further, when utilizing the conventional types of targets for tri-color pickup tubes, i.e. targets including color filter means, it has not been possible to utilize certain solid photoconductors to match the spectral response of each of the different colors. This occurs due to the fact that the spectral responses of certain colors are matched only by solid photoconductive materials which have a low volume resistivity. As was set forth above, utilization of the photoconductive materials having a low volume resistivity has not been possible prior to this time. Due to this limitation, complicated filter designs must be utilized to give higher color sensitivities.

Furthermore, when utilizing present day targets for tri-color pickup tubes, a certain amount of color "cross-talk" may occur. As an example, a green output signal may be obtained from a red light due to light entering the photoconductor between the filters, or due to spreading of the photocurrent between adjacent strips of photoconductive material.

It is therefore an object of this invention to provide a new and improved target for television camera tubes.

It is another object of this invention to provide a new and improved target structure for camera and pick-up tubes having higher sensitivity and conductivity.

It is a further object of this invention to provide a new and novel target structure for camera and pick-up tubes having a substantial reduction in photoconductive "lag."

More specifically, it is an object of this invention to provide a new and improved target structure for camera and pick-up tubes having a substantial reduction in the target capacity.

It is a still further object of this invention to provide a new and novel target structure for color television pick-up tubes having improved sensitivity and a reduction of color cross-talk.

It is another object of this invention to provide a new and improved target structure having capacities that are small enough to warrant the effective use of an electron multiplier in conjunction with the target structure.

These and other objects have been accomplished in accordance with the general aspects of this invention by providing a target structure in which the flow of charge through the photo-conductor is substantially parallel to the plane of the target instead of normal thereto. The target may comprise a photoconductive layer, which may be either a film or strips, in contact with a signal electrode means at a plurality of spaced apart junction areas. Protective insulator strips cover the spaced apart junction areas so that the electron beam does not deposit electrons anywhere on the photoconductor except on the portions of the photoconductor which are adjacent to the areas where the photoconductor is in contact with the signal electrodes. The light from a scene which falls on the photoconductor causes current to flow laterally from the areas exposed to the beam to adjacent junction areas of the target. The areas of the target which are illuminated by the scene to be reproduced charge to a potential of few volts positive in the brightest parts of the picture. When the beam scans the target, the beam deposits sufficient electrons to neutralize the positive charge and in so doing produces, by means of capacity coupling, a video signal output. The "capacitor" in which the charge is stored is formed between the scanned area and the laterally displaced junction area of the target with the protective insulator covering the junction area.

The novel features which are believed to be characteristic of this invention are set forth with particularity in the appended claims. The invention itself will best be understood by reference to the following description taken in connection with the accompanying five sheets of drawings in which:

Figure 2 is an enlarged fragmentary sectional view of the target for the pickup tube shown in Figure 1;

Figures 3 through 6 are enlarged fragmentary sectional views of embodiments of the target shown in Figure 2;

Figure 1:
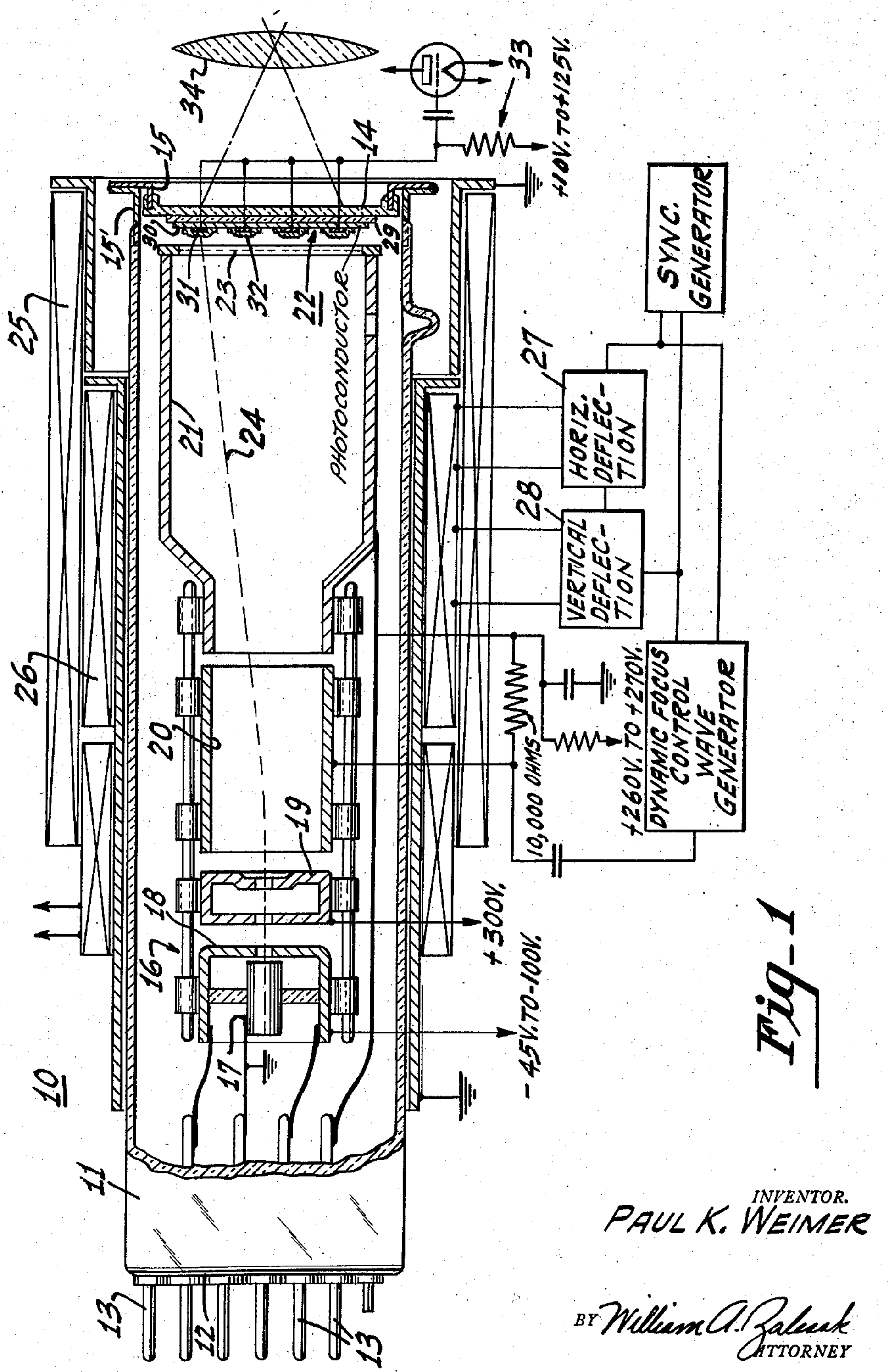
Figure 1 is a longitudinal sectional view of a pickup tube utilizing a target constructed in accordance with the invention.

Referring now to Figure 1 in detail, there is shown a longitudinal sectional view of a television pickup tube utilizing a target structure in accordance with this invention. The pickup tube 10 comprises an evacuated tubular envelope 11 which is closed at one end by a wall portion 12 through which a plurality of base pins 13 are sealed. At the other end of the envelope 11, a flat optically clear face plate 14 is sealed to a flanged metal ring 15 which in turn is sealed to another flanged metal ring 15'. The metal ring 15' is sealed to the open end of envelope 11. Coaxially mounted within the tubular envelope 11 is an electron gun 16 consisting of a small tubular cathode electrode 17, a control grid electrode 18, and an accelerating electrode 19.

Electron beam focusing means is provided which comprises electrodes 20 and 21 which are formed as long tubular metal electrodes positioned in tandem and insulatingly spaced a short distance apart, as shown. One end of electrode 20 is closely spaced from accelerating electrode 19 while electrode 21 extends to a position adjacent to the face plate 14. All of the gun electrodes are mounted coaxially and are spaced from each other along the axis of the tubular envelope 11.

During tube operation, appropriate potentials are applied to the several electrodes and may be in the order of the values shown in the figure. However, the potentials shown, which are for a so-called low velocity beam type of operation, are not to be considered as limiting the invention but only illustrate those potentials which have been used successfully in a tube of the type described. It should also be understood that the device 10 can be operated using a high velocity scanning beam. In the example illustrated in Fig. 1, the focus electrodes 20 and 21 are connected to a common potential source of around 260 volts positive to ground. A high resistance of around 10,000 ohms separates electrode 20 from electrode 21, as shown.

A filamentary heater (not shown) within the cathode 17 raises the temperature of the cathode coating to a point where electrons are freely emitted from the cathode coating. A negative potential on control grid 18 can be varied to control the number of electrons which will be drawn through the aperture of grid 18 by the positive accelerating field of electrode 19 which extends through the aperture of grid 18.

On the face plate 14 closing the opposite end of the tube envelope 11, there is formed a photosensitive target structure 22 which will be described in detail in connection with the other figures of the drawings.

Across the open end of the tubular electrode 21, and adjacent to the target 22, there is mounted a fine mesh screen 23 which is electrically a part of focusing electrode 21. During tube operation, the surface of target 22 is normally between ground, or zero potential, and a few volts positive with respect to ground. Electrode 21 is normally operated at around 260 volts positive. There is an electrostatic field between the end of electrode 21 and the target 22. The electron beam 24, upon passing through the mesh screen 23, is quickly decelerated within a very small space from the velocity given to the beam 24 by the focusing electrode 21 to a velocity in the order of zero volts. The electron beam 24 lands on any positive areas of the target 22, and will be repelled or reflected back toward screen 23 from areas of the target 22 which are at cathode potential or ground. In the dark, i.e. the no signal condition, the target 22 is maintained at cathode or ground potential by means of the electron beam. The electrons adjacent to the target 22 are moving at very low energies and in such a condition are highly responsive to the field shape adjacent the target 22. Thus, for optimum tube operation, it is desirable that the electric field be substantially perpendicular to the surface of target 22. The fine mesh screen 23 flattens this field so that the equipotential surfaces are substantially parallel to the surface of the target 22.

To focus the electron beam 24 to a fine spot on the surface of target 22, a magnetic field is used with its lines of force extending substantially parallel to the axis of electron gun 16 and normal to the surface of the target 22. The field is established by a coil 25 enclosing the tubular envelope 11 and extending from a point adjacent to accelerating electrode 19 beyond the face plate 14 of the envelope 10 as shown. The electrons passing through the small aperture in accelerating electrode 19 enter into the magnetic field established by coil 25 and are brought to a focus substantially at the surface of target 22.

Referring now to Figure 2, there is shown a greatly enlarged fragmentary view of the target 22 shown in Figure 1. The target 22 comprises a support plate 29 having a thin layer of photoconductive material 30 on the face of the support plate 29 which is exposed to the electron beam 24. Spaced apart, and on the exposed surface of the photoconductive material 30, is a plurality of narrow conducting signal strips 31 each of which forms a junction with the photoconductor 30 and all of which form a signal output electrode. Covering the exposed surfaces of each of the signal strips 31, i.e., the areas of junction between the photoconductor 30 and each of the signal strips 31, and partially extending over the adjacent exposed areas of the photoconductive material 30, is a thin protective insulating member, or shield 32. Each of the signal strips 31 is covered by one of the insulator shields 32. Connected to the signal strips 31, which may be connected together in any manner, is an output circuit 33. The lead-ins for each of the signal strips 31 is shown as coming through the support plate 29 for purposes of simplicity of illustration. In practice, the ends of the strips 31 would be connected inside the tube to a common lead which could extend through the side of the envelope 10. It should be understood that the face plate 14, of Figure 1, can function as a support plate, or a support plate 29 may be mounted inside the tube adjacent to the face plate.

The support plate 29 may be any transparent plate such as glass, mica, or quartz, and may be of any thickness ranging from one eighth of an inch to less than one ten-thousandth of an inch. Alternatively, the support plate 29 may comprise a thin transparent film such as aluminum oxide supported on a ring or coated on the face plate 14 of Figure 1 in which case the support plate 29 may be of the order of 100 Angstrom units in thickness.

It should be understood that other means for supporting the target may be utilized in place of support plate 29. One such other means is to support the signal strips on a ring electrode (not shown). Another such means is to utilize a thin semi-conductor (not shown), on the beam side of the target. If the thin semiconductor is utilized the semiconductor should be sufficiently insulating to prohibit lateral electron flow and sufficiently conductive to permit transverse electron flow. A semiconductor such as lime glass of approximately .1 mil in thickness will provide the proper support for a target such as target 22.

The signal strips 31 may be any highly conductive material such as aluminum, gold, or tin oxide and may be approximately 100 to 1000 Angstrom units thick. The width of the signal strips 31 may be of the order of one half a thousandth of an inch.

The total number of signal strips 31 in the target area may be from approximately 500 to several thousand which will depend upon the size of the tube and the quality of picture desired. The number of signal strips 31 is preferably as large as possible for highest definition of the pictures with the signal strips 31 being very narrow. It should also be understood that the signal strips 31 may be in the form of a fine mesh electrode if desired.

The photoconductive material 30 may be any of the well known photoconductive materials which have high sensitivity such as antimony sulfide, cadmium selenide, cadmium sulfide, or selenium. The photoconductive material may be of a thickness within the range of 1000 Angstrom units in thickness up to several microns in thickness. The resistivity of the photoconductive material 30 may vary over a wide range and may be as low as $10^8-10^9$ ohm-centimeters provided the layer is made sufficiently thin. The photoconductive layer may be deposited on the support plate by evaporation, by crystallization, by chemical reaction, or other means.

The thin insulator shields 32 may be of material such as zinc sulfide, magnesium fluoride, quartz, or aluminum oxide and may be of a thickness up to 1 micron. Any material that is a good insulator may be utilized for the insulator shields 32 with the examples given above merely disclosing materials which are known to have good insulating properties. A specific example, which is given merely to illustrate this invention, is as follows: assume a target is to be constructed which is 1.5 inches wide; further, assuming that 1000 elements per target are required for adequate resolution; then the distance between strips 31, center to center, could be .0015 inch; with the strips 31 being .0003 inch wide; the width of an exposed area of photoconductor 30 being .004 inch wide; and the width of an insulator strip 32, from an edge of signal strip 31, could be .0004 inch. It should be understood that the specific dimensions given above are given merely as being illustrative of an example of this invention.

During tube operation, appropriate voltages are applied to the corresponding electrodes as is indicated in Fig. 1. The electrons from cathode 17 are formed into a beam 24 and are urged toward the target 22. The electron beam 24 is scanned across the surface of target 22 in a rectangular raster by magnetic deflecting fields produced by a conventional deflecting yoke 26. The deflection yoke 26 normally consists of two pairs of magnetic coils with the coils of each pair connected in series and positioned on opposite sides of the tube envelope 11. The pairs of coils are arranged so that the field produced by one pair is substantialy normal to the field of the other pair. Each pair of coils is connected to appropriate sources of saw-tooth voltages 27 and 28 to produce both horizontal deflection and vertical deflection respectively of the electron beam in a conventional manner to provide a rectangular scansion raster. The means for producing this type of scansion of the electron beam is well known and is not considered further as it is not a part of the invention.

Electrons will be deposited on the surface of photoconductor 30, and on the strips of insulator 32, due to the positive field from signal strips 31, until the potential of the scanned area is driven to substantially cathode, or ground potential. Since the signal strips 31 are biased positive with respect to ground, there will be a potential drop laterally across the photoconductor 30, i.e., between an exposed area of the photoconductor 30 and an adjacent junction area of photoconductor and signal strip. Subsequently, as the electron beam 24 approaches any point on the photoconductive film 30 which is at ground potential, the beam 15 will be reflected or turned back and will be urged toward the fine mesh screen 23.

If a light pattern, such as an optical scene or picture, is focused by an appropriate lens structure 34 onto the photo-conductive film 30, electrical conduction will take place laterally through film 30 in those areas exposed to light while substantially no conduction occurs in those areas upon which no light falls. Areas that are illuminated by a light intensity between dark and bright will provide an intermediate conductivity through film 30 which is a function of the amount of light striking the area. Because of the 50 volt potential difference between the exposed surface of film 30, at ground potential, and the conductive signal strips 31, at a positive 50 volts, a lateral current flow will take place in the illuminated areas and in proportion to the amount of light striking each area. It should be understood that the 50 volts is chosen merely as an example of successful operation. The areas of the exposed surface of photo-conductive film 30 which are exposed to light will become charged positively toward the potential of the conducting signal strips 31. There is thus established on the exposed surface of photo-conductive film 30 a pattern of positive charges corresponding to the pattern of light focused on the target.

The forming of the charge pattern on the photoconductive surface is normally within 1/30 of a second which is the scanning frequency of the electron beam. Each charged area of the exposed portion of film 30 constitutes a storage area which is connected by capacity to an output circuit 33.

The electron beam 24, when scanning the charge pattern established on the surface of film 30, deposits electrons in the positive areas until each area is driven negatively to the potential of the cathode 17 and the remaining portion of the beam is reflected back toward screen 23. When the beam leaves an illuminated area of film 30, the area will charge up positively toward the potential of film 30 as long as the light remains on the area and until the beam returns to the same point 1/30 of a second later. However, as the beam discharges each positively charged point of the surface of film 30, a capacitive current is produced in the adjacent signal strip which constitutes the video output signal of the tube. The magnitude of this signal is proportional to the potential of each surface area of photo-conductive film 30 discharged by the beam.

A more detailed description of the general operation of tubes of this type may be found in a copending application of B. J. Vine et al., filed December 10, 1953, Serial No. 397,312, now abandoned, and assigned to the same assignee as the present invention.

Due to the fact that the charge flows from an exposed area of the photoconductor 30, through the photoconductor 30 to an adjacent junction of the photoconductor 30 and signal strip 31, this type of target is designated a "lateral flow target" as compared to the conventional targets wherein the charge flows perpendicularly to the surface of the photoconductive material. Since the photoconductor 30 may be thin, the RC time constant may be as much as 100 times larger in the lateral flow target than the RC time constant would be in a target utilizing the same material in a conventional type of target. This feature of a larger RC time constant permits the use of a lower volume resistivity, for example from approximately $10^{11}$ ohm-centimeters in prior tubes down to $10^9$ ohm-centimeters in tubes according to this invention which makes available for pickup tubes many new types of photoconductive materal.

Due to the fact that, in lateral flow targets, the capacity may be readily controlled by the selection of the proper geometry between the various elements of the target, capacities small enough to permit the effective use of electron multipliers are possible. Since, in lateral flow targets, thinner layers of photoconductive material may be utilized giving more effective penetration by the light, there is obtained from this type of target: (*a*) greater sensitivity for highly absorptive materials having short range carriers, and (*b*) decreased photoconductive "lag" by virtue of the fact that there is more light available throughout the photoconductor for release of the electrons from traps.

Referring now to Figure 3, there is shown an enlarged fragmentary sectional view of a modification of the target structure that is shown in Figure 2. The target 35 comprises a supporting plate 36 having thereon a plurality of spaced apart conducting signal strips 37, all of which are connected to an output circuit 33. Covering the exposed surfaces of each of the signal strips 37, and the exposed surfaces of the support plate 36 which are in between and signal strips 37, is a sheet of photoconductive material 38. As can be seen from the drawing, the signal strips 37 and the photoconductive material 38 form a plurality of junction areas. Extending over the photoconductive material 38, in the junction areas, i.e. the area over each of the signal strips 37, is a thin strip of insulating material 39. Each of the insulating strips 39 is over one of the signal strips 37 as shown. Each of the plurality of strips of insulating material 39 is spaced apart so that the beam 24 may land on exposed areas of the photoconductive material 38 even if a charge is developed on the insulating material 39. The materials disclosed in connection with Figure 2, as well as the dimensions thereof, are also suitable for use in connection with the target 35 shown in Figure 3. The operation of target 35 is also substantially the same as that described in connection with Figures 1 and 2 in that current flow occurs substantially in the plane of the target 35.

Referring now to Figure 4, there is shown an enlarged fragmentary sectional view of an embodiment of this invention wherein a monochrome target 40 comprises a self-supporting sheet of photoconductive material 41 having a plurality of closely spaced signal strips of conducting material 42 arranged on one surface thereof. Each of the strips of conducting material 42 is connected to a signal output circuit 33 as shown. Covering each of the individual strips of the conducting material 42, and extending over the adjacent portions of the photoconductive sheet 41, are individual insulator strips 43. Each of the conducting strips 42, and each of the insulator strips 43, may be of a size and material similar to that disclosed in connection with Figure 2. The photoconductive material 41 may be of a material such as a crystalline sheet of cadmium sulfide and may be of a thickness of the order of one thousandth of an inch or less in order for the photoconductive material 41 to be self-supporting. The periphery of the photoconductive material may span a support ring (not shown) in the envelope 11. The operation of target 40 is the same as described in connection with Figures 1 and 2.

Referring now to Figure 5, there is shown a fragmentary sectional view of an embodiment of a target for a monochrome pickup tube in accordance with this invention. The target 44 comprises a support plate 45 having on one surface thereof, i.e., the beam side, a continuous conductive layer 46. The conductive layer 46 functions as a signal output electrode and is connected to a signal output circuit 33 as shown. The conductive layer 46 is transparent to permit the passage of light therethrough. Spaced apart on the exposed surface of the signal output electrode 46 is a plurality of insulating strips 47. Completely spanning the insulating strips 47, and also the exposed surfaces of the signal output electrode 46 which are in between each of the insulating strips 47, is a continuous sheet of photoconductive material 48. Spanning each of the areas of the photoconductor 48 which is in contact, i.e. forms a junction, with the signal plate 46, and extending slightly over the areas covered by the insulating strips 47, is an insulating strip 49 which prevents the beam 24 from landing on the areas of target 44 in which the photoconductor 48 is in contact with the signal plate 46. Materials and dimensions of the target elements similar to those described in connection with Figure 2 may be utilized in the target 44. However, it is necessary to utilize a transparent conducting material for the signal plate, one such material is tin oxide. The operation of target 44 is substantially the same as that described in connection with Figures 1 and 2.

Referring now to Figure 6, there is shown an enlarged fragmentary sectional view of a target 50 constructed in accordance with this invention. The target 50 comprises a thin self-supporting sheet of photoconductive material 51 having spaced apart strips of insulating material 52 on the side thereof on which the beam 24 lands. On the other side, i.e., the light input side, of photoconductive material 51 there is provided a plurality of transparent insulating strips 53 which are spaced apart on the photoconductive material 51 and are opposite the portions of the photoconductive material 51 which are exposed to beam 24. Completely covering the insulating strips 53, and the portions of the photoconductor 51 in between the insulating strips 53, is a transparent continuous signal plate 54. The materials and thicknesses for the target 50 may be similar to the materials and thicknesses of target 40 as described in connection with Figure 4 except that there is now used a continuous transparent signal plate 54 which may be of the well known transparent conductive coatings such as tin chloride. The operation of target 50 is substantially the same as described in connection with Figures 1 and 2.

Figure 7:
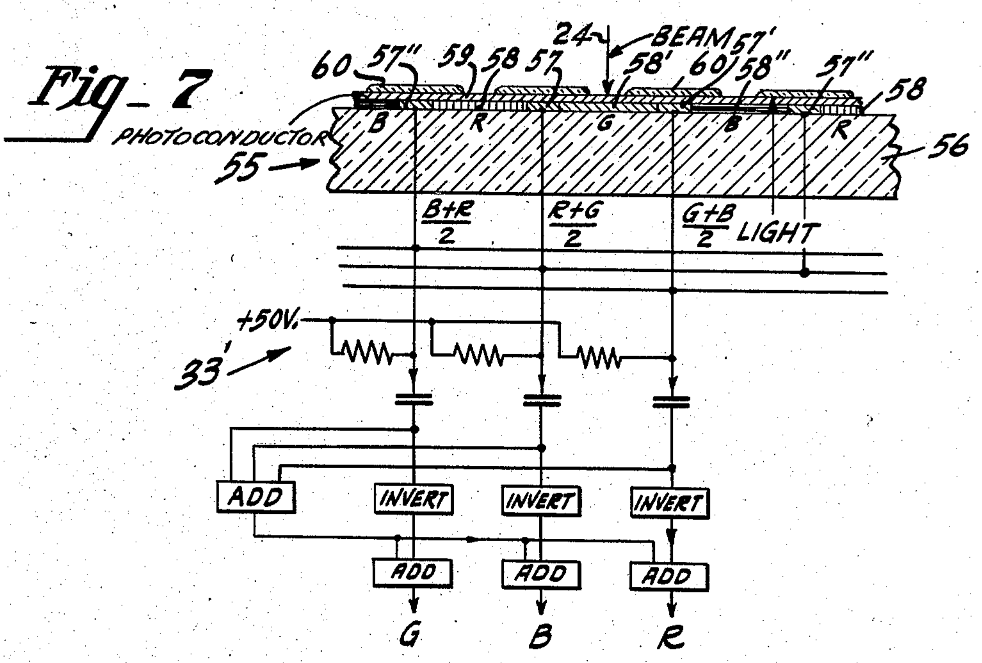
Figure 7 is an enlarged fragmentary sectional view of a target for a tri-color pickup tube in accordance with this invention.

Referring now to Figure 7, there is shown a fragmentary sectional view of a target for use in tri-color pickup tube in accordance with this invention. The target 55 comprises an insulating support plate 56 having thereon a plurality of spaced apart conducting signal strips 57, 57′ and 57″. In between each adjacent pair of the signal strips 57, 57′ and 57″ is an electrically insulating color filter strip 58, 58′ and 58″ respectively. Completely spanning the exposed surfaces of the insulating filter strips 58, 58' and 58'' and the exposed surfaces of the signal strips 57, 57' and 57'' is a thin layer of photoconductive material 59. Spaced apart, on the exposed surface of the photoconductive layer 59, in each of the areas adjacent each of the conducting signal strips 57, 57' and 57'', and extending over the adjacent areas of each of the filter strips 58, 58' and 58'', is an insulating strip 60.

The materials utilized in the target 55 may be similar to materials and sizes heretofore disclosed in connection with Figure 2. The thin insulating filter strips 58, 58' and 58'' are preferably made from some type of multilayer interference filter. These filter strips are normally made of alternate layers of a high index material, such as zinc sulfide, and low index materials, such as magnesium fluoride, with the thicknesses of each layer chosen to give the desired color. Other materials which may be used as the insulating material in the multilayer interference filters are cryolite and zinc selenide. Of course, it should be understood that other types of insulating filter strips may be utilized to derive the various color signals.

It should be noted that the insulating filter strips 58, 58' and 58'' are arranged in the conventional red, green, blue, arrangement with a signal strip 57, 57' and 57'' respectively between each of the separate filter strips 58, 58' and 58''. Each of the conducting signal strips 57 is arranged between the filter strips 58 and 58', i.e., the green and red filter strips, and the video output signal is derived from the two strips 58 and 58' resulting in half the sum of the green and red signals being obtained from the signal strip 57. Likewise, signal strip 57' which is arranged between the filter strips 58' and 58'' provides green and blue signals and the signal strip 57'' which is arranged between filter strips 58'' and 58, gives blue and red information. Each of the signal strips 57, 57' and 57'' is connected to a signal output circuit 33' in which each signal is inverted and added to the sum of the three color signals to derive separate green, red and blue color signals respectively. The operation of target 55 is substantially the same as that described in connection with Figures 1 and 2 in that current flow occurs laterally through the photoconductor 59. The only difference is that in the areas adjacent to the signal strips 57, the photoconductor 59 is actuated by both the green and red colors. The signal derived from signal strips 57 corresponds to half the sum of the green and red signals which is equivalent to the response for yellow light. Since yellow is the complement of blue light, the blue response can be obtained by subtracting the yellow light response from the total white response obtained by adding the signals from all three sets of strips 57, 57', 57''. The signal-to-noise ratio is reduced by a factor of two in this process. Similar circuitry is provided for signal strips 57' and 57''. A more detailed description of a pickup tube for tri-color television, and the general operation thereof, may be found in a Patent 2,446,249 to A. C. Schroeder.

Figure 8:
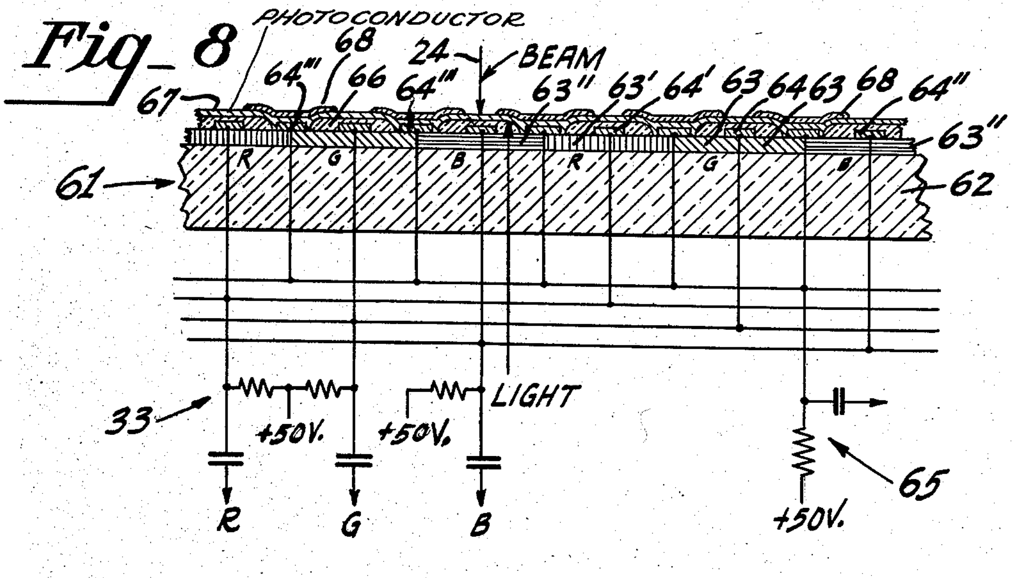
Figures 8 through 12 are enlarged fragmentary sectional views of other embodiments of tri-color pickup tube targets in accordance with this invention.

Referring now to Figure 8, there is shown an enlarged fragmentary sectional view of an embodiment of a target construction in accordance with this invention which is adapted for use in tri-color pickup or camera tubes. The target 61 comprises a glass support plate 62 having on one surface thereof a plurality of contiguous insulating color filter strips 63, 63' and 63''. Spaced apart on the exposed surfaces of the filter strips 63, 63' and 63'' is a plurality of conducting signal strips 64, 64' and 64''. It should be noted that one of the signal strips 64, 64' and 64'' is arranged substantially in the center of each of the filter strips 63, 63' and 63'' respectively. Also, in between each of the signal strips 64, 64' and 64'' is a signal strip 64''' each of which is at the junction of a pair of filter strips such as 63 and 63'. Each of the plurality of signal strips 64, 64' and 64'' is connected to an output circuit for the individual colors, i.e., green, red, and blue respectively. Each of the signal strips 64''' is connected to a circuit 65 for use as the signal that is conventionally utilized in forming low noise, "mixed high," information.

Covering each of the signal strips 64, 64' and 64'', and extending over each of the filter strips, is a strip of insulating material 66. Each of the insulating strips 66 covers one of the signal strips 64, 64' or 64''. Entirely covering the plurality of insulating strips 66, and also the exposed conducting signal strips 64''', is a thin layer of photoconductive material 67. Spanning each of the areas of the photoconductive material 67 which is in direct contact with one of the signal strips 64''', and extending slightly over the photoconductive material 67 which is adjacent each of the signal strips 64''', is a strip of insulating material 68 which prevents the beam 24 from landing on the junction areas of photoconductor and signal strips.

The materials for use in construction of the target 61 are similar to those described in connection with Figure 7. Each of the signal strips 64''' may be similar to the signal strips 64, 64', or 64''. The operation of the target 61 is similar to that described in connection with Figure 7 with the difference being that a true primary signal is obtained from the signal strips, i.e., 64 green, 64' red, and 64'' blue. Furthermore, signals for use in forming low-noise mixed high information may be obtained from signal strips 64''' when desired.

The color video output signal is developed by the capacity coupling between the photoconductor 67 and a signal strip 64, 64', or 64'' that is closely adjacent thereto. For example, assuming a green colored image is directed onto the target 61, then light passes through filter strip 63 to activate the photoconductor 67 so that current flow occurs adjacent the signal strip 64 which is for the green color. When the beam neutralizes the charge accumulated on the photoconductor area over the signal strip 64, the current pulse induces an output signal in the signal strips 64 due to the capacitive coupling between photoconductor 67 and signal strip 64. The other signal strips, i.e., 64' red and 64'' blue, operate in a similar manner.

Figure 9:
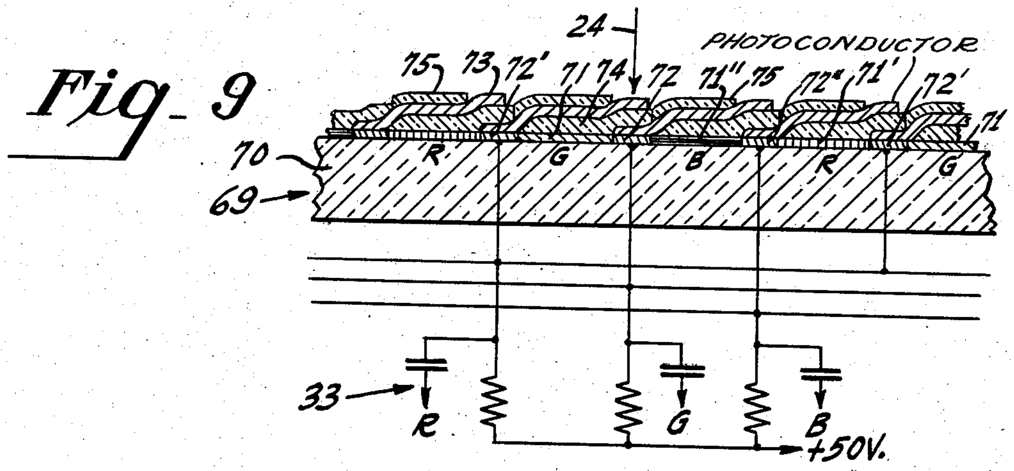

Referring now to Figure 9, there is shown an enlarged fragmentary sectional view of an embodiment of a target structure constructed in accordance with this invention which is adapted for use in a tri-color pickup tube. The target 69 comprises a sheet of insulating material 70, which functions as a support plate. Spaced apart, and on the beam side of the support plate 70 is a plurality of insulating color filter strips 71, 71', and 71'', which are respectively for the green, red, and blue filtered signals. Arranged in between each of the color filter strips 71, 71', and 71'' is a signal strip 72, 72', and 72''. Connected to each of the plurality of signal strips 72, 72', and 72'' is one edge of one of a plurality of photoconductor strips 73. Individually covering each of the plurality of color filter strips 71, 71', and 71'' is a transparent insulator strip 74. Each of the insulator strips 74 extends over an adjacent photoconductive strip 73 in the area where the adjacent photoconductive strip 73 is in contact with one of the color signal strips 72, 72', and 72''. Covering the areas of each of the photoconductive strips 73 which is directly over one of the insulating color filter strips 71, 71', and 71'' is a protective insulator strip 75. It should be understood that the insulator strips 74 and the insulator strips 75 may be constructed as one piece. However, for ease of manufacture it is preferable to utilize separate strips of insulating material.

As can be seen from the drawing of Figure 9, when the electron beam 24 scans the target 69, electrons are deposited on each of the areas of the photoconductive strips 73 which are directly adjacent to a junction of a photoconductor and a signal strip 72, 72', or 72''. Current flows to a signal strip 72, 72', or 72'', only when a filter strip 71, 71', or 71'' is actuated to make the photoconductive material a conductor. When current flow occurs, the charge is stored in the capacitor which is formed between the edge of the photoconductor 73 and the closely adjacent signal strips 72, 72', or 72'', When the beam deposits electrons on the photoconductor area over the signal strips 72, 72' and 72", the output signal capacitively coupled to these strips is proportional to the amount of light which passes through the filter strips 71, 71' and 71" giving the green, red and blue signals respectively. The operation of target 69 is substantially the same as that described in connection with Figure 8 in that current flow occurs laterally through the photoconductor 73.

Figure 10:
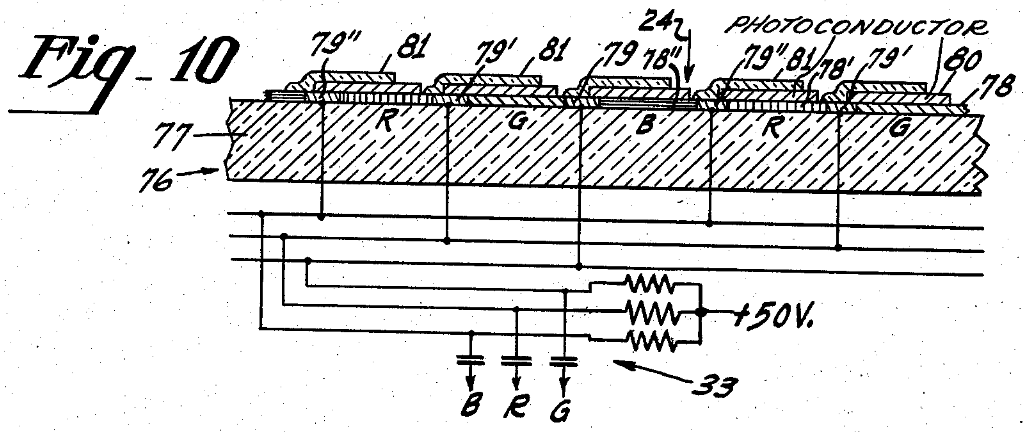

Referring now to Figure 10, there is shown an enlarged fragmentary sectional view of an embodiment of a target structure for use in tri-color transmitting tubes. The target 76 comprises a supporting plate 77 having a plurality of spaced apart color filter strips 78, 78', and 78" on the beam 24 side thereof. Arranged between each of the color filter strips 78, 78', and 78" is a signal strip 79, 79', and 79", each of which is connected to an output circuit 33 for the respective green, red, and blue colors. Extending substantially over each of the color filter strips 78, 78', and 78", and partially over the adjacent signal strips 79, 79', and 79", is a photoconductor strip 80. Partially covering the exposed surfaces of each of the photoconductor strips 80, on the beam 24 side thereof, and extending over the balance of each of the signal strips 79, 79', or 79" is a protective insulator strip 81. The materials, and the geometry, of the target 76 may be in accordance with those disclosed in connection with Figure 7.

The operation of target 76 is similar to that described in connection with Figure 8. Briefly, the operation of target 76 is such that, each of the strips of photoconductor 80 which is over a color filter 78, 78', or 78", using 78' for red as an example, conducts current when light of the particular wavelength, i.e. red is focused on the target. When current is conducted it is stored on the edge of the photoconductor strip 80 which is spaced from the adjacent signal strip 79' for red. The close proximity of the edge of the photoconductor strip to the signal strip provides the electrical capacity for storage and ensures that signal output from each set of signal strips 79, 79' and 79" corresponds to the light transmitted by the adjacent filters 78, 78' and 78".

Figure 11:
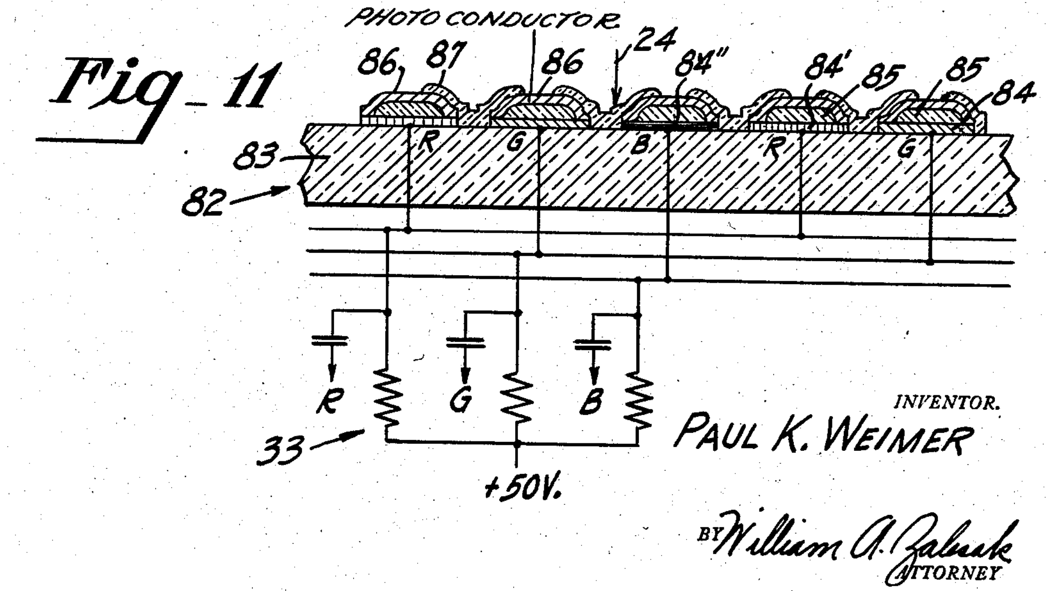

Referring now to Figure 11, there is shown an enlarged fragmentary sectional view of a target 82 for use in a tri-color pickup tube in accordance with this invention. The target 82 comprises a supporting transparent insulating plate 83 having a plurality of spaced apart transparent conducting light filter signal strips 84, 84', and 84" thereon. Each of the conducting color filter signal strips 84, 84', and 84" functions as a conductor i.e. as a signal strip, as well as a color filter which permits the passage of light of a particular wavelength therethrough. Such conducting filters may be interference filters of the solid Fabry Perot type in which an insulating dielectric is sandwiched between two thin layers of metal. Substantially centrally disposed on top of each of the conducting color filter signal strips 84, 84', and 84", there is an insulator strip 85. Each of the insulator strips 85 extends closely adjacent to the edges of one of the conducting color filter signal strips 84, 84', or 84". Covering each of the plurality of insulator strips 85, and in contact with the edges of each of the individual conducting color filter signal strips 84, 84', and 84", is a photoconductive strip 86. Covering each of the exposed portions of the support plate 83, and partially extending over each of the adjacent photoconductive strips 86, is a protective insulator strip 87. As can be seen from Figure 11, each of the insulator strips 87 only partially shields an adjacent pair of the photoconductive strips 86 from the beam 24 thereby permitting the beam 24 to land on the exposed surfaces of photoconductive material 86 whereby current will flow to the desired conducting filter signal strips 84, 84', or 84", for the green, red, or blue respectively when the conducting color filter strips are actuated by the proper light.

During operation of target 82, the charge is stored in the capacitor which is formed between a surface of the individual strips of photoconductor 86 which is exposed to the beam 24 and the adjacent conducting color filter signal strips 84, 84', and 84".

Figure 12:
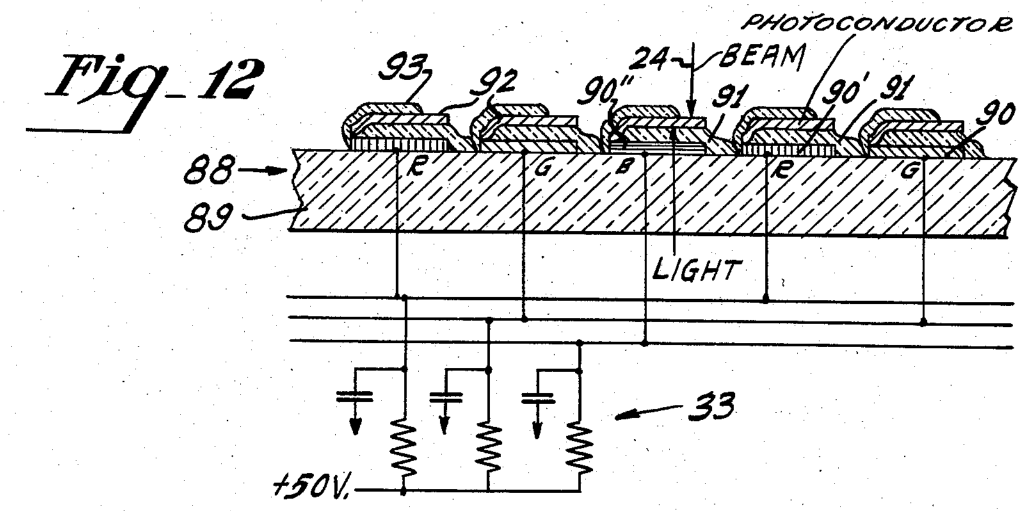

Referring now to Figure 12, there is shown an enlarged fragmentary sectional view of a target structure for use in a tri-color pickup tube in accordance with this invention. The target 88 comprises a glass support plate 89 having spaced apart light transparent conducting color filter signal strips 90, 90', and 90" deposited on the side thereof facing the electron beam 24. Substantially covering each of the exposed areas of the support plate 89, i.e., the areas which are in between the conducting color filter strips 90, 90', and 90", there is an insulator strip 91 which extends partially over each of the conducting color filter signal strips 90, 90', or 90". Substantially covering each of the insulating strips 91, and extending over to an edge of a respective conductive color filter signal strip 90, 90', or 90", is a thin photoconductive strip 92. Extending over the areas of each of the photoconductor strips 92, which is in contact with one of the conducting color filter strips 90, 90', or 90", is a protective insulator strip 93. Each of the protective insulator strips 93 extends substantially over the top of one of the thin photoconductive strips 92 leaving only a portion of each of the photoconductor strips 92 exposed to the electron beam 24.

Each of the separate elements of target 88 may be substantially the same as disclosed in connection with Figure 11, i.e., both as to material and size. The operation of target 88 is also similar to that described in connection with Figure 11. The conducting filter illustrated in Figs. 11 and 12 may be replaced by an equivalent combination comprising an insulating filter with a superposed transparent conducting signal strip.

Each of the embodiments of the invention disclosed and described in connection with Figures 7 through 12 inclusive is adapted for use with tri-color television pickup tubes. The operation of the various targets is similar to that disclosed in connection with the monochrome targets described in Figures 1 through 6 inclusive, except for the fact that each of the individual photoconductive strips in the color pickup tubes will be actuated only when the respective color filter strips permit light of a selected wavelength to pass through. The sensitivity and the quality of the targets produced in accordance with this invention is dependent upon the number of photo conductive strips and signal strips per unit area of the target. As a general rule, the larger the number of photoconductive strips per unit area, the higher will be the sensitivity and the resolution of the target produced.

In each of the targets disclosed in Figures 7 through 12 inclusive, the signal strips may be narrow, opaque lines such as evaporated aluminum. The more narrow each of the signal strips, the greater the portion of the photoconductor which is exposed to the light and the higher the sensitivity obtained from the target.

Figure 13:
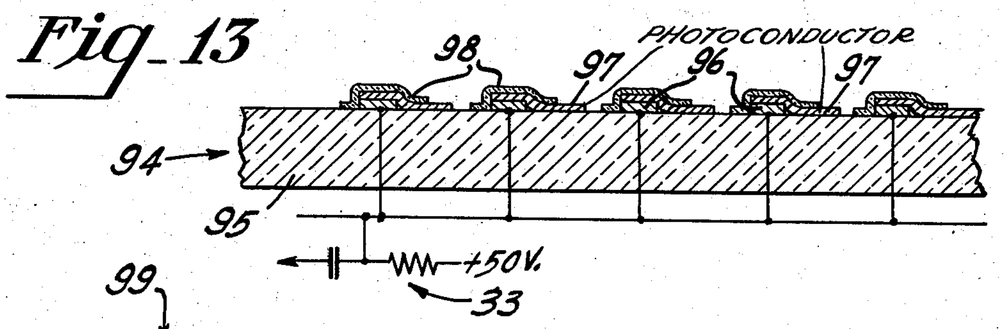
Figure 13 is an enlarged fragmentary sectional view of a modification of a target structure in accordance with this invention.

In each of the targets described in connection with Figures 2 through 7, the current flow in the photoconductor may occur to the area exposed to the beam from either of the two adjacent conducting signal strips, which are effectively in parallel. In cases when the photoconductor resistivity is low, it may be desirable to reduce the dark current by providing only a single path from each of the signal strips to the exposed, or storage area of the photoconductor. Such a target is illustrated in Figure 13, which is an enlarged fragmentary sectional view of modification of this invention wherein target 94 comprises a glass support 95. Spaced apart on the surface of the support plate 95 that is exposed to the electron beam, is a plurality of conducting signal strips 96. Covering each of the signal strips 96 is a different strip of photoconducting material 97, each of which extends over one side of the exposed portions of support plate 95 to be spaced from the adjacent signal strip 96. Partially covering each of the photoconductor strips 97, and extending over the exposed edge of each of the signal strips 96 onto support plate 95, is a strip of insulating material 98. Since the photoconductors 97 are spaced apart, the lateral flow current path through the target 94 is effectively through a single path instead of through two shorter paths in parallel. It may be noted that the single path conduition is also obtained in the tri-color modifications illustrated in Figures 9, 10 and 12.

The modification shown in Figure 13 may be used, when desired, with materials and dimensions substantially the same as described in Figures 1 through 7 inclusive.

In each embodiment illustrated in Figures 1 through 13, it has been assumed that the lateral conductivity of the photoconductor is sufficiently low so that no significant deterioration in resolution results from leakage parallel to the signal strips. If the volume resistivity of the photo conductor is sufficiently low so that such leakage occurs, it may be desirable to divide the photoconductor into strips whose direction is perpendicular to the signal strips. Thus, Figs. 2, 3, 5, 7 and 8, which called for a continuous thin film of photoconductor, could equally well represent a target in which the photoconductor was divided into narrow strips arranged at an angle with respect to the signal strips.

Photoconductor leakage parallel to the signal strips can also be avoided in the target modifications of Figs. 9, 10, 11, 12, and 13, by dividing the photoconductor strips into short tabs. Thus, Fig. 14 shows a plan view of the target of Fig. 13 which has been so modified.

Figure 14:
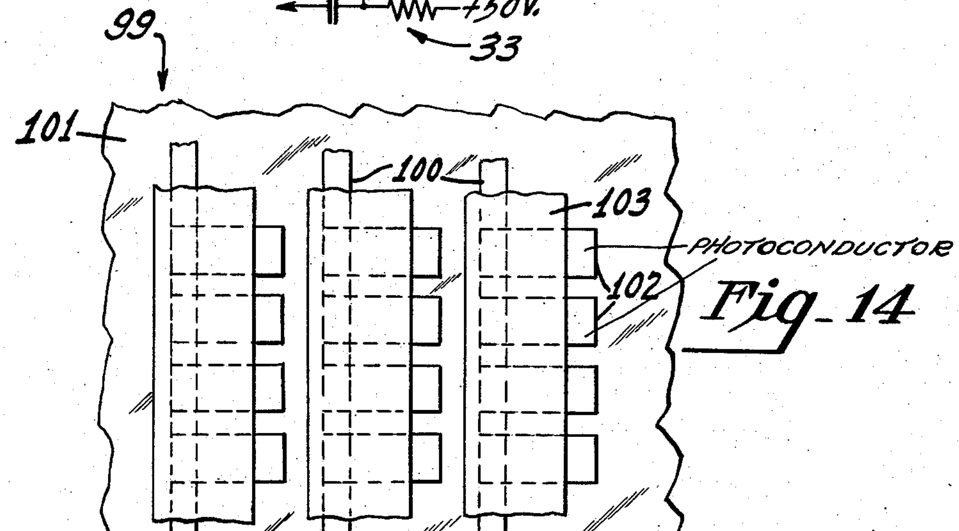
Figure 14 is an enlarged fragmentary top view of a still further modification of a target structure in accordance with this invention.

Referring now to Figure 14, there is shown an enlarged fragmentary top view of a modification of a target constructed in accordance with this invention. Target 99 comprises a plurality of signal strips 100 which are supported on a support plate 101 at spaced apart intervals. Spaced along each of the signal strips 100 is a plurality of photoconductor tabs 102. Partially covering each of the pluralities of photoconductive tabs 102 is a different insulating strip 103. As can be seen from the drawing, the insulator strips 103 extend over the junction between each of the photoconductive tabs 102 and each of the signal strips 100.

The target 99 has greater definition of the picture reproduced since each of the photoconductive tabs is isolated one from the other and leakage therebetween is substantially eliminated by the use of this embodiment. Also, the current paths are effectively in series as has been described. However, in order to construct a target having individual photoconductive tabs, extreme care must be taken to ensure that the photoconductive tabs are in the proper relationship with respect to the other elements of the tube.

It should be understood that in the targets in Figures 2, 4, and 10 the protective insulator strips 32, 43, and 81 respectively may be omitted and the advantages of the coplanar grid effect may be obtained. These benefits may be obtained in the targets shown in the other figures by omitting the protective insulators and by making the other elements of the targets thin enough for the coplanar grid effect to occur. For example, if the insulators 29 are omitted from the target shown in Figure 3, and the photoconductor 38 made approximately 1000 Angstrom units thick, the coplanar grid effect can be utilized.

Briefly, the coplanar grid effect may be explained by referring to Figure 2 with the insulators 32 omitted, and assuming a 50 volt positive potential on the signal strips 31. During the no signal condition, the photoconductor 30 is driven to cathode potential, i.e. zero. When this occurs equipotential surfaces occur adjacent to the signal strips 31 having a potential which is negative with respect to the signal strips. This negative potential tends to suppress the secondary emission from the strips which are bombarded by electrons from the beam. When light falls upon the photoconductor 30, the beam side thereof becomes slightly positive due to conduction through the photoconductor. This causes equipotential surfaces over the signal strips to become less negative than they were when the photoconductor was dark. Thus, in the lighted areas the secondary electrons dislodged from the signal strips 31 are more likely to escape which provides an output signal. The output signal can be obtained in the conventional manner from the signal strips themselves or by collecting the modulated secondary electron beam and passing it through an electron multiplier. Since the net beam current deposited on the strips 31 may actually be larger than photoconductive charge which was stored on the photoconductor, an entrance signal output may be obtained by the coplanar grid action.

What is claimed is:

1. A target for a television pickup tube comprising, conducting means forming signal output means, photoconductive means in contact with said conducting means at a plurality of spaced apart points, insulating means covering said points on the side of said target which is adapted to be scanned by an electron beam, and the balance of said target exposed on said side whereby electron flow occurs laterally through said photoconductive means.

2. A target for a television pickup tube comprising, conducting means forming signal output means, a photoconductive means in contact with said conducting means at a plurality of spaced apart areas, and shielding means covering each of said areas to prevent an electron beam from landing on said areas, and the balance of said target being exposed to said beam whereby current flow occurs laterally through said photoconductive means.

3. A target for a television pickup tube comprising a sheet of photoconductive material, a plurality of spaced apart conductive elements on one surface of said photoconductive material, a plurality of strips of insulating material, and each of said strips of insulating material covering the areas where said photoconductive material and said conductive elements make contact and extending slightly beyond each of said areas.

4. A target for a television pickup tube as in claim 3 wherein said insulating material is in contact with said conductive elements.

5. A target for a television pickup tube as in claim 3 wherein said photoconductive material is supported by a sheet of insulating material.

6. A target for a television pickup tube comprising, a transparent conductive signal plate, a first plurality of spaced apart strips of insulating material on one surface of said signal plate, a sheet of photoconductive material on one side of said strips of insulating material and connected to said signal plate in the areas in between each of said strips of insulating material, a second plurality of strips of insulating material, and each of said second plurality of strips of insulating material being spaced on the other side of said photoconductive material over the areas where said photoconductive material and said signal plate are joined and extending slightly beyond said areas.

7. A target for a pickup tube as in claim 6 wherein said signal plate is a substantially flat strip of conductive material.

8. A target for a pickup tube as in claim 6 wherein said photoconductive material is a substantially flat strip of photoconductive material.

9. A target for a tri-color pickup tube comprising a plurality of spaced apart strips of conductive material forming a signal electrode, a plurality of color filter strips each being in contact with one of said strips of said signal electrode, photoconductive means in contact with said signal strips at spaced apart areas, and a plurality of insulator strips each on said photoconductive means over one of said areas and each extending beyond each of said areas.

10. A target for a tri-color pickup tube as in claim 9 further comprising a second plurality of insulating filter strips each of which covers the junction between one of said signal strips and one of said color filters.

11. A target for a tri-color pickup tube comprising a plurality of contiguously arranged color filters, a first plurality of signal strips each arranged substantially on the center of one of said color filters, a second plurality of signal strips each arranged at the junction of two of said color filters, a first plurality of insulating strips each covering one of said signal strips in said first plurality of signal strips and partially covering the respective color filter, a protoconductive means covering said first insulating strips and said second plurality of signal strips, and a second plurality of insulating strips each covering one of the junction areas of said second plurality of signal strips and said photoconductive means and extending slightly beyond.

12. A target for a tri-color pickup tube comprising a plurality of spaced apart strips of conducting material forming a signal output electrode, a plurality of color filter strips each contiguously arranged intermediate a pair of said strips of conducting material, a sheet of photoconductive material covering said strips of conducting material and said color filter strips, and a plurality of strips of insulating material each covering one of the junction areas of one of said signal strips and the adjacent contiguous pair of said color filter strips.

13. A target for a tri-color pickup tube comprising a plurality of spaced apart strips of conducting material forming a signal output electrode, a plurality of color filter strips each contiguously arranged intermediate a pair of said strips of conductive material, a plurality of strips of photoconductive material each supported on a part of one of said strips of conducting material and on an adjacent color filter strip, and a plurality of strips of insulating material each covering the balance of one of said strips of conducting material and extending partially over the respective strip of photoconductive material.

14. A target for a tri-color camera tube comprising a transparent support member, a plurality of conducting color filter strips spaced apart on said support member to form color filter means and signal output means, a first plurality of strips of insulating material each covering a central portion of one of said plurality of conducting color filter strips, a plurality of strips of photoconductive material each covering one of said first plurality of strips of insulating material and the remainder of a respective conducting color filter strip, and a second plurality of strips of insulating material each covering an area of said support plate intermediate an adjacent pair of said strips of conducting color filters and extending over both of the adjacent junction areas of photoconductive material and conducting color filter strips.

15. A target for a tri-color camera tube comprising, a transparent support member, a plurality of conducting color filter strips spaced apart on said support member, a first plurality of insulating strips each covering a part of the exposed area of said support member intermediate said conducting color filter strips and a part of an adjacent conducting color filter strip, a plurality of strips of photoconductive material each covering the balance of one of said conducting color filter strips and extending over a portion of a respective one of said first plurality of insulating strips, and a second plurality of strips of insulating material each covering the balance of said exposed area of said support member intermediate said conducting color filter strips and extending over a part of a respective one of said strips of photoconductive material.

16. A target for a television pickup tube comprising, a support member, a plurality of conducting strips spaced apart on said support member, a plurality of photoconductive strips each covering one of said conducting strips and extending over a part of said support member intermediate said conducting strips but spaced from an adjacent one of said conducting strips, a plurality of strips of insulating material each covering the junction area of one of said photoconductive strips and one of said conducting strips and extending over a part of a respective one of said photoconductive strips and over a part of an exposed area of said support member intermediate an adjacent photoconductive strip and said respective photoconductive strip.

17. A target for a television pickup tube comprising, a support member, a plurality of strips of conducting material spaced apart on said support member, a plurality of tabs of photoconductive material being spaced apart on each of said strips of conducting material and extending over adjacent areas of said support member, and a plurality of strips of insulating material each covering said strips of conducting material and a part of each of a respective group of said photoconductive tabs.

18. A target electrode including superimposed layered areas of conducting material and photoconductive material, insulating shielding areas covering the areas of contact between said conducting material and said photoconductive material, and said photoconductive material having portions exposed beyond said insulating shielding areas.

19. A target electrode including an insulating transparent supporting base, superimposed layered areas of conducting material and photoconductive material supported on said base, insulating shielding areas covering the areas of contact between said conducting material and said photoconductive material, and portions of said photoconductive material being exposed beyond said insulating shielding areas.

20. A target electrode as in claim 19 further comprising a plurality of color filters.

21. A target electrode for a television pickup tube, said target electrode including an insulating support member, a plurality of spaced apart signal output electrodes on one surface of said support member, photosensitive means extending substantially between said electrodes and in electrical contact with at least one of said electrodes, means for shielding said contact so that current flow through said photosensitive means is substantially parallel to said support member.

22. A target electrode structure comprising a support member, electrode means supported by means including said support member, photosensitive means in electrical contact with said electrode means, and means for shielding said contact so that current flow through said photosensitive means is substantially parallel to said support member.

References Cited in the file of this patent

UNITED STATES PATENTS

| | | |
|---|---|---|
| 1,747,988 | Sabbah | Feb. 18, 1930 |
| 2,236,172 | Gray | Mar. 25, 1941 |
| 2,238,381 | Batchelor | Apr. 15, 1941 |
| 2,373,395 | Hefele | Apr. 10, 1945 |
| 2,403,239 | Rose | June 2, 1946 |
| 2,622,219 | Schagen | Dec. 16, 1952 |